United States Patent [19]

Itoh et al.

[11] Patent Number: 4,678,688
[45] Date of Patent: Jul. 7, 1987

[54] METHOD FOR FORMING A SURFACE FILM OF CURED ORGANOSILICON POLYMER ON A SUBSTRATE SURFACE

[75] Inventors: Kunio Itoh; Shohei Kozakai; Yoshinori Hida; Hiroshige Okinoshima; Fumio Okada; Toshio Oba; Hisashi Shimizu; Yuji Hinoto; Hiroshi Yoshioka, all of Gunma, Japan

[73] Assignee: Shin-Etsu Chemical Co., Ltd., Tokyo, Japan

[21] Appl. No.: 834,906

[22] Filed: Feb. 28, 1986

Related U.S. Application Data

[63] Continuation-in-part of Ser. No. 686,301, Dec. 26, 1984, abandoned.

[30] Foreign Application Priority Data

Dec. 28, 1983 [JP] Japan .................. 58-251952
Jan. 10, 1984 [JP] Japan .................. 59-2374
Apr. 17, 1984 [JP] Japan .................. 59-77155

[51] Int. Cl.$^4$ ............................... B05D 3/02
[52] U.S. Cl. ................... 427/387; 528/28; 528/38
[58] Field of Search ............... 528/28, 38; 427/387

[56] References Cited

U.S. PATENT DOCUMENTS 3,239,550 3/1966 Murray ................. 528/28
3,243,404 3/1966 Matellock ............. 528/38
4,417,042 11/1983 Dziark .................. 528/34

Primary Examiner—Melvyn I. Marquis
Attorney, Agent, or Firm—Jules E. Goldberg

[57] ABSTRACT

The inventive method for forming a cured film on a substrate surface comprises coating the surface with a room temperature curable organosiloxazane polymer comprising, in a molecule, (a) at least one organosiloxane unit represented by the unit formula (a) at least one organosiloxane unit represented by the unit formula

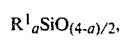

$$R^1{}_a SiO_{(4-a)/2},$$

and (b) at least one organosilazane unit represented by the unit formula

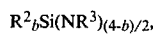

$$R^2{}_b Si(NR^3)_{(4-b)/2},$$

in which $R^1$, $R^2$ and $R^3$ are each a hydrogen atom or a substituted or unsubstituted monovalent hydrocarbon group, not all of them being simultaneously hydrogen atoms, and the subscripts a and b are each a positive integer of 1, 2 or 3 with the proviso that a and b cannot be simultaneously equal to 3, in a molecule and subjecting the coating film to exposure to a moisture-containing atmosphere. The method is useful for forming a surface-protecting film or for imparting surface releasability.

3 Claims, No Drawings

METHOD FOR FORMING A SURFACE FILM OF CURED ORGANOSILICON POLYMER ON A SUBSTRATE SURFACE

BACKGROUND OF THE INVENTION

This is a continuation-in-part application from a co-pending U.S. patent application Ser. No. 686,301 filed Dec. 26, 1984 and now abandoned.

The present invention relates to a method for forming a surface film of a cured organosilicon polymer on a substrate surface or, more particularly, to the above mentioned method using an organosilicon polymer containing nitrogen atoms bonded to the silicon atoms and readily curable by exposure to a moisture-containing atmosphere even in the absence of any curing catalyst, of which the cured film firmly adheres to the substrate surface on which it has been cured to give a tenacious cured surface film.

There are known several types of room-temperature curable organosilicon polymers or silicone compositions capable of forming a surface film on various substrates. A class of the most typical room-temperature curable silicone compositions includes those composed of a linear diorganopolysiloxane terminated at both molecular chain ends each with a siliconbonded hydroxy, i.e. silanol, group with admixture of a hydrolyzable organosilicon compound such as acyloxysilanes, alkoxysilanes, aminoxysilanes and the like and a curing catalyst and such a composition is curable when exposed to a moisture-containing atmosphere. There are also known room temperature-curable silicone resin compositions capable of giving a relatively rigid or hard cured film. The mechanism involved in such a curing reaction is the reaction between silanol groups or between a silanol group and a silicon-bonded alkoxy group as catalyzed by a fatty acid salt of metal or an amine compound.

The above described conventional room temperature-curable silicone compositions all require admixture of a curing catalyst. A problem in such a catalyst-containing silicone composition, however, is that the composition is unstable in storage as a matter of course and premature curing or gelation of the composition is sometimes unavoidable. Therefore, it is a usual practice in the silicone industry that such a composition is supplied in two packages each containing a different component or a combination of different components from the other and the contents of the two packages are blended together directly before use of the completed composition to cause a great disadvantage and inconvenience in respect of the workability. A further problem in the prior art room temperature-curable silicone compositions is the insufficient activity of the catalyst so that curing of the composition takes an unduly long time and can be accelerated only by heating.

Other types of known curable silicone compositions include those compositions curable by the polymerization reaction of ethylenically unsaturated hydrocarbon groups, e.g. vinyl groups, bonded to the silicon atoms of the molecule in the presence of a curing agent such as an organic peroxide and those compositions curable by the addition reaction between an ethylenically unsaturated hydrocarbon group bonded to the silicon atom and a hydrogen atom directly bonded to the silicon atom of the organopolysiloxane molecule in the presence of a catalyst which is typically a platinum compound. The curable compositions of the former type can be cured only by heating and the compositions of the latter type, which can be cured at room temperature, are also not free from the inconvenience accompanying the two-package type compositions mentioned above. A serious problem common to these two types of the curable silicone compositions is the poor adhesion of the cured composition to the substrate surface on which it has been cured and this disadvantage is more serious as a trend when the formulation of the composition is of the type for increased curing velocity so that use of a primer on the substrate surface in advance is indispensable to ensure good adhesion of the cured film and the substrate surface.

SUMMARY OF THE INVENTION

An object of the present invention is therefore to provide a novel method for forming a cured surface film on a substrate using an organosilicon polymer or silicone polymer by curing the same at room temperature even without the addition of any catalyst and free from the above described problems and disadvantages unavoidable in the use of conventional curable silicone compositions.

The organosilicon polymer used in the method of the invention is an organosiloxazane polymer comprising:

(a) at least one organosiloxane unit represented by the unit formula $$R^1_a SiO_{(4-a)/2}, \qquad (I)$$

and (b) at least one organosilazane unit represented by the unit formula $$R^2_b Si(NR^3)_{(4-b)/2}, \qquad (II)$$

in which $R^1$, $R^2$ and $R^3$ are each a hydrogen atom or a substituted or unsubstituted monovalent hydrocarbon group, not all of them being simultaneously hydrogen atoms, and the subscripts a and b are each a positive integer of 1, 2 or 3 with the proviso that the subscripts a and b cannot be simultaneously equal to 3, in a molecule. It is preferable that at least a part of the organosiloxane units and/or organosilazane units should be trifunctional units with the subscripts a and/or b equal to 1 capable of forming three-dimensional crosslinks. It is more preferable that the organosilazane units include trifunctional units. When the above defined organosiloxazane polymer, preferably, in the form of a solution is applied to the surface of a substrate followed by drying to form a film and kept standing in an atmosphere containing, the polymer is crosslinked by the reaction with the atmospheric moisture to form a cured surface film on the substrate surface.

Such an organosiloxazane polymer can readily be prepared by the reaction of ammonia or a primary amine compound with a mixture composed of:

(i) an organopolysiloxane represented by the average unit formula $$R^1_c X_d SiO_{(4-c-d)/2}, \qquad (III)$$

in which $R^1$ has the meaning as defined above, X is a halogen atom and the subscripts c and d are each a positive number smaller than 4 with the proviso that c+d is smaller than 4; and (ii) an organosilicon compound or an organosilane compound having at least one silicon-bonded halogen atom in a molecule.

DETAILED DESCRIPTION OF THE PREFERRED EMBODIMENTS

As is described above, the organosiloxazane polymer used in the method of the invention is composed of two types of the monomeric units including the organosiloxane units and organosilazane units represented by the unit formulas (I) and (II), respectively.

In the unit formula (I) for the organosiloxane unit, $R^1$ is a hydrogen atom or a monovalent hydrocarbon group exemplified by alkyl groups such as methyl, ethyl, propyl and butyl groups, aryl groups such as phenyl and tolyl groups, alkenyl groups such as vinyl and allyl groups and cycloalkyl groups such as cyclohexyl group as well as those substituted hydrocarbon groups obtained by the replacement of a part or all of the hydrogen atoms in the above named hydrocarbon groups with substituent atoms or groups such as halogen atoms and cyano groups. The groups denoted by $R^1$ in a molecule may not be of the same kind but two or more kinds of the groups can be contained in a molecule although it is preferable that not all of the groups $R^1$ in a molecule are hydrogen atoms. The subscript a is 1, 2 or 3 to give tri-, di- and monofunctional siloxane units, respectively.

As is mentioned above, the monovalent hydrocarbon group denoted by $R^1$ may be at least partially substituted by various kinds of substituent atoms and groups according to the particular curing behavior of the polymer and performance and properties desired of the resultant polymer and the cured product thereof. Some of the substituents include halogen atoms, alkoxy groups such as methoxy and ethoxy groups, amino group, cyclohexylamino group, oxime group, epoxy group, acryloxy group, methacryloxy group and the like. Particular examples of such substituted hydrocarbon groups include those expressed by the formulas $CF_3CH_2CH_2-$, $Gl-O+CH_2\overline{\jmath_3}$, $CH_2=CH-CO-O-CH_2)_3$, $CH_2=CMe-CO-O+CH_2\overline{\jmath_3}$ and $NH_2+CH_2\overline{\jmath_3}$, in which the symbols Me and Gl denote a methyl and a glycidyl group, respectively.

The units of the other type essentially contained in the molecule of the organosiloxazane polymer in combination with the above described organosiloxane units are the organosilazane units represented by the unit formula (II) above given, in which $R^2$ and $R^3$ are each a hydrogen atom or a monovalent hydrocarbon group selected from the class consisting of the above named groups given as the examples of the hydrocarbon groups for $R^1$ in the unit formula (I) although not all of the groups $R^2$ in a molecule are preferably hydrogen atoms. Several examples of the units in conformity with the formula (II) include: $MeSi(NH)_{1.5}$; $CH_2=CHSi(NH)_{1.5}$; $EtSi(NH)_{1.5}$; $n-C_{10}H_{21}Si(NH)_{1.5}$; $(CF_3)_2CF=CF_2\overline{\jmath_8}CH_2CH_2Si(NH)_{1.5}$; $PhSi(NH)_{1.5}$; $Me(MeO)Si(NH)_{1.0}$; $Me(MeEtC=NO)Si(NH)_{1.0}$; $CH_2=CMe-CO-O+CH_2\overline{\jmath_3}(OMe)Si(NH)_{1.0}$; and $NH_2+CH_2\overline{\jmath_3}Si(NH)_{1.5}$, in which the symbols Me, Et and Ph each denote a methyl, an ethyl and a phenyl group, respectively.

The organosiloxazane polymer composed of the above described two types of the monomeric units and used in the inventive method can be prepared by the reaction of ammonia or a primary amine compound with a mixture of (i) an organopolysiloxane represented by the above given average unit formula (III) having at least one silicon-bonded halogen atom and (ii) an organosilicon compound or organosilane compound having at least one halogen atom directly bonded to the silicon atom in a molecule. The organopolysiloxane of the average unit formula (III) is exemplified by those compounds expressed by the following formulas:

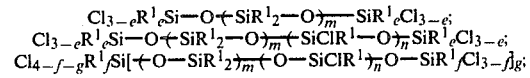

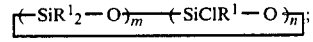

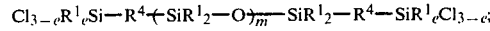

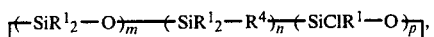

in which $R^1$ has the same meaning as defined above, $R^4$ is a divalent hydrocarbon group exemplified by alkylene groups such as ethylene, propylene and butylene groups and arylene groups such as phenylene and tolylene groups, e is zero, 1 or 2, f is zero, 1 or 2, g is 1, 2 or 3 with the proviso that f+g is not larger than 4 and m, n and p are each a positive integer.

The above described chlorine-containing organopolysiloxane compound (i) can be prepared in several known synthetic methods including, for example, the equilibration polymerization reaction between a cyclic organopolysiloxane compound and a chlorosilane compound such as dimethyl dichlorosilane, methyl trichlorosilane and silicon tetrachloride, partial hydrolysis reaction of an organochlorosilane compound, chlorination reaction of an organohydrogenpolysiloxane having at least one silicon-bonded hydrogen atom in a molecule or an addition reaction thereof with a chlorine-containing alkenylsilane compound and addition reaction of an alkenyl-containing organopolysiloxane and a chlorine-containing silane compound having at least one silicon-bonded hydrogen atom in a molecule.

The chlorine-containing organosilicon compound (ii) to be reacted with the above described chlorine-containing organopolysiloxane (i) is preferably a silane or polysilane compound and suitable silane compounds therefor are exemplified by those compounds expressed with the following formulas including:

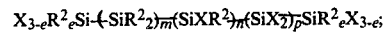

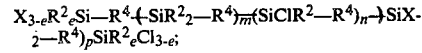

and

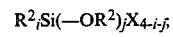

in which h is zero, 1, 2 or 3, i is zero, 1, 2 or 3 and j is zero, 1, 2 or 3 with the proviso that i+j is 1, 2 or 3, X is a halogen atom and $R^2$, $R^4$, e, m, n and p each have the same meaning as defined above. These (poly)silane compounds can be prepared in several known methods including, for example, the chlorination reaction of an organopolysilane compound having at least one silicon-bonded hydrogen atom in a molecule, addition reaction between a halogen-containing alkenylsilane compound and a chlorine-containing silane compound having a silicon-bonded hydrogen atom in a molecule and partial alkoxylation reaction of a chlorine-containing silane compound.

The organosiloxazane polymer of the invention is prepared by the reaction of the above described organopolysiloxane compound (i) and the halogen-containing organosilane compound (ii) with ammonia or a primary amine, preferably, in the presence of an organic solvent. Ammonia is preferred as the reactant to primary amines in view of the higher efficiency of the reaction. The type of the organic solvent is not particularly limitative provided that it is inert to the reactants of the organosilicon compounds and ammonia or primary amines and capable of dissolving the organosiloxazane polymer formed by the reaction including, for example, aromatic hydrocarbons such as benzene, toluene and xylene, chlorinated hydrocarbons such as methylene chloride and trichloroethane, ethers such as diethyl ether and tetrahydrofuran, ketones such as acetone, methyl ethyl ketone, methyl isopropyl ketone and methyl isobutyl ketone, and the like. These organic solvents may be used as a mixture of two kinds or more according to need. The volume of the organic solvent is not particularly limitative and should be selected in consideration of the amount of the ammonium chloride formed as a by-product in the reaction mixture and gelation of the resultant polymer product possibly taking place when the volume of the organic solvent is too small.

Since the reaction proceeds exothermically, no intentional heating of the reaction mixture is usually necessary and the reaction should be performed at a temperature in the range from 0° to 50° C. The molar ratio of the halogen-containing organopolysiloxane compound (i) and the halogen-containing organosilane compound (ii) in the reaction mixture is not particularly limitative and can be varied within a wide range depending on the types and properties of the desired organosiloxazane polymer. It should be noted, however, that increase in the amount of the halogen-containing silane compound (ii) containing a relatively large amount of halogen may result in the increase in the curing velocity of the organosiloxazane polymer obtained by the reaction due to the increased content of the highly hydrolyzable silazane linkages. Such an effect of increasing the curing velocity of the polymer product is also obtained when the halogen content in the halogen-containing organopolysiloxane (i) or the halogen-containing silane compound (ii) is increased.

The molecular structure of the resultant polymer product can be controlled by suitably selecting the reactants (i) and (ii) to meet the requirement. For example, the reaction started with a linear diorganopolysiloxane terminated at both molecular chain ends each with a silicon-bonded chlorine atom gives an organosiloxazane polymer having a linear organopolysiloxane structure in the main chain.

When the reaction is performed in the above described manner, the organosiloxazane polymer as the reaction product is obtained in the form of a solution in the organic solvent used as the reaction medium. If necessary, the resultant reaction mixture should be diluted with a suitable organic solvent as exemplified above, which may be the same as or different from the solvent used as the reaction medium, to give an appropriate concentration of the polymer and viscosity of the solution in consideration of the workability in the subsequent application of the polymer solution. It is of course optional with an object to improve the workability of the polymer solution and the properties of the cured film formed of the polymer that the resultant polymer solution is further admixed with various kinds of additives including fillers, coloring agents and the like provided that the additive is not reactive with the silazane linkages in the polymer as is the case when a silanol compound, alcoholic compound or water is added.

When the organosiloxazane polymer in the form of a solution is applied to the surface of a substrate and exposed to a moisture-containing atmosphere in practicing the method of the invention, the polymer is rapidly crosslinked and cured even at room temperature to give a cured film which firmly adheres to the substrate surface on which it has been cured. For example, the adhesion is complete not only to the substrates such as glass, ceramic, aluminum and the like on which considerably good adhesion is obtained even with conventional curable silicone compositions but also to the substrate materials such as various kinds of plastics including, in particular, polycarbonate and acrylic resins and synthetic rubbers to which no good adhesion of cured silicone compositions can be obtained without the use of a primer. It is of course optional to accelerate curing of the coating film of the polymer by heating with hot air or infrared radiation. Further, the coating solution may be admixed with certain curing catalysts known to accelerate the silanol condensation reaction such as fatty acid salts of tin, lead, iron and the like metal or alkyl titanates when acceleration of curing is desired. When the hydrocarbon groups in the polymer have a sensitivity to actinic radiations such as acryloxy and methacryloxy groups as a substituent group on the monovalent group denoted by $R^1$ or $R^2$ forming, for example, a 3-acryloxypropyl group of the formula $CH_2=CH-CO-C-CH_2CH_2CH_2-$ or 3-methacryloxypropyl group of the formula $CH_2=CMe-CO-C-CH_2CH_2CH_2-$, the cured film of the inventive polymer can be imparted with a further increased crosslinking density by the irradiation with ultraviolet light, electron beams and other actinic rays.

Furthermore, the physical properties, e.g. mechanical, electric, magnetic and other properties, of the cured film formed by the inventive method can be improved or modified by formulating the coating solution with fillers including various kinds of organic, inorganic or metallic particulate or fibrous materials such as glass beads, quartz powder, carbon black, graphite powder, talc, mica powder, powders of metals, e.g. silver, copper, nickel, aluminum, zinc and the like, alumina powder, zinc white, titanium dioxide, glass fibers, carbon fibers, organic synthetic fibers, and powders of ceramics such as boron nitride, silicon carbide, silicon nitride and the like. When a large amount of a metallic fillers in the form of a powdery, flaky or fibrous form is added to the polymer, the resultant cured coating film is imparted with good electric conductivity and useful as a shielding layer against electromagnetic or radio waves. By virtue of the outstanding mechanical properties of the cured film and good adhesion thereof to the substrate surface, the inventive method is very useful as a method for forming an anti-abrasion coating material on various articles of synthetic plastic resins although the usefulness of the inventive method is not limited thereto.

Further, the cured coating film of the organosiloxazane polymer formed by the method of the invention is useful as a surface-releasing film, for example, on the surface of a metal mold for molding various plastic articles and release papers for temporary protection of adhesive or sticky surfaces. When the intended application of the inventive method is for the formation of a surface-releasing film, the organosiloxazane polymer should contain the organosiloxane units in the range from 5 to 50% by moles based on the overall monomeric units. A wide variety of materials can be imparted with surface releasability by coating with such an organosiloxazane polymer followed by curing including glass, woody materials, plastics, metals, concrete and the like. The method of forming a surface-releasing film according to the invention is also useful in the regeneration of the worn-out releasability of various substrate materials repeatedly or prolongedly used after a treatment with a conventional silicone-based release agent.

When the intended application of the inventive method is for the formation of a surface-releasing film on a substrate surface with the organosiloxazane polymer as a surface-release agent, it is preferable that the organosiloxazane polymer comprises, in the molecular structure thereof, at least one sequence of dihydrocarbylsiloxane units of the formula $+SiR^1{}_2-O)_{\overline{m}}$, in which $R^1$ has the meaning as defined above or, more preferably, is a methyl group and m is a positive integer of at least 8. An organosiloxazane polymer containing at least one of such a dihydrocarbylsiloxane or dimethylsiloxane moiety in the molecule can be prepared by use of a chlorine-terminated diorganopolysiloxane of the formula $Cl-(SiR^1{}_2-O)_{\overline{m-1}}SiR^1{}_2-Cl$, in which $R^1$ and m each have the meaning as defined above, as the organopolysiloxane represented by the average unit formula (III) as one of the reactants to be reacted with ammonia or a primary amine compound. When a cured surface film having a low surface tension is desired, at least a part of the monovalent groups denoted by $R^1$ or $R^2$ should preferably be substituted with a perfluoroalkyl group as exemplified by 2-(perfluorooctyl)ethyl and 2-(perfluorobutyl)ethyl groups.

In the following, examples are given to illustrate the inventive method for the formation of a cured film of an organosiloxazane polymer as well as the method for the preparation thereof in more detail. In the following description, the symbol Me denotes a methyl group.

EXAMPLE 1

A solution of 10 g of methyl trichlorosilane dissolved in 200 ml of methylene chloride chilled at 5° C. or below was admixed dropwise with 1.7 g of a 29% ammonia water and then with 10 g of methyl trichlorosilane and then ammonia gas was blown into the mixture for 3 hours while the temperature of the solution was kept at 15° C. or below followed by further agitation for additional 2 hours without outer cooling. Thereafter, the reaction mixture was heated under reflux for 1 hour to expel the excess of the ammonia contained in the solution which was then cooled and the precipitated ammonium chloride therein was removed by filtration to give a clear, colorless solution containing a polysiloxazane compound.

Shaped articles of an acrylic resin and a polycarbonate resin were coated with the solution by dipping therein followed by standing for 72 hours at room temperature so that the shaped articles were coated with a clear, colorless cured film of the polysiloxazane. The cured coating film was subjected to the adhesion test according to the procedure specified in ASTM D 3359 and it was found that the adhesion of the coating film was complete in class 5. Further, the coating films were rubbed with a #0000 steel wool to test the abrasion resistance. The result was that no cloudiness appeared on the surface to retain good clarity of the coating film. The same rubbing test undertaken for the uncoated shaped articles of the resins for comparative purpose resulted in the remarkable appearance of dullness in the surface luster of the resin surfaces.

EXAMPLE 2

A reaction mixture prepared by dissolving 15 g of an equimolar mixture of methyl trichlorosilane and 3-(methacryloxy)propyl trichlorosilane in 200 ml of methylene chloride was admixed dropwise with 1.9 g of a 29% ammonia water and then with 15 g of the same silane mixture as above and then subjected to the reaction with ammonia gas in the same manner as in Example 1 to give a polysiloxazane compound. The solution was further admixed with benzoin isobutyl ether as a photosensitizer in an amount of 0.5% by weight based on the amount of the polymer and the solid content of the solution was adjusted to 20% by weight.

The polymer solution was applied to a plate of a polycarbonate resin by spraying and kept standing for 24 hours at room temperature followed by the irradiation with ultraviolet light emitted from a high-pressure mercury lamp of 80 watts/cm output by moving below the lamp at a velocity of 20 m/minute. The polymer film was converted into a fully cured clear, colorless film.

A similar coating and curing test was undertaken to prepare a coated polycarbonate resin plate by use of a solution obtained by dissolving 10 g of the above obtained polysiloxazane polymer and 10 g of dipentaerithritol pentacrylate in 80 ml of methylene chloride.

Each of the cured coating films in the above tests was clear and colorless exhibiting excellent adhesion to the substrate surface with absolutely no peeling of the coating layer in the checkerboard test according to the procedure specified in ASTM D 3359. Further, it was found that these coating films were more wear-resistant than the coating film in Example 6 in the abrasion test by rubbing with #0000 steel wool with absolutely no appearance of cloudiness.

EXAMPLE 3

A mixture composed of 60 moles of methyl trichlorosilane and 40 moles of 1,3-dimethyl-1,1,3-trimethoxy-3-chlorodisiloxane was diluted with 150 ml of methylene chloride and a polysiloxazane compound was prepared with this solution in the same manner as in Example 1.

In the next place, 2 g of hexamethyldisiloxane, 50 g of a nickel powder having an average particle diameter of 2 μm and 0.1 g of dibutyltin dilaurate were added to 100 g of a methylene chloride solution containing 20% by weight of the above obtained polysiloxazane compound and uniformly dispersed therein by use of a mixer to form a coating composition with which an acrylic resin plate was coated by use of a wire-bar applicator followed by standing for 72 hours at room temperature to find that the resin plate was coated with a fully cured and firmly adhering coating film having a thickness of about 30 μm. This coating film exhibited good electroconductivity with a volume resistivity of 0.2 ohm.cm and was useful as a shielding material of radio waves.

EXAMPLE 4

A mixture of 25 g of 2-(n-perfluorooctyl)ethyl trichlorosilane and 750 g of trichlorofluoromethane was admixed dropwise with 1.1 g of a 29% ammonia water and then with 25 g of 2-(n-perfluorooctyl)ethyl trichlorosilane and then ammonia gas was blown into the mixture under agitation in a reaction vessel equipped with a stirrer, reflux condenser and thermometer. As the blowing of the ammonia gas was started, the temperature of the reaction mixture began to rise reaching the refluxing point of trichlorofluoromethane. Introduction of the ammonia gas was discontinued when the overall amount of introduction had reached 15.5 parts by weight and switched to introduction of nitrogen gas into the reaction mixture which was was further agitated for additional 4 hours under reflux. The precipitated ammonium chloride in the reaction mixture was removed by filtration and the trichlorofluoromethane in the filtrate solution was removed by evaporation to leave 39.8 g of a white powdery product.

This powdery product was dissolved in trichlorofluoromethane in a concentration of 3% by weight and the solution was applied onto an acrylic resin plate followed by drying at room temperature. The critical surface tension of the surface of the thus formed coating film was 9.8 dyn/cm and the adhesion of the coating film to the substrate surface was complete in the adhesion test according to ASTM D 3359.

For comparison, the same acrylic resin plate was coated with a solution prepared by dissolving 2-(n-perfluorooctyl)ethyl trimethoxysilane in trichlorofluoromethane in place of the above prepared polysilazane compound but the coating film could not be cured even on prolonged standing at room temperature to give no protecting layer.

EXAMPLE 5

A reaction mixture in a reaction vessel formed by dissolving 40 g of a mixture composed of 88.8% by weight of methyl trichlorosilane and 11.2% by weight of a dimethylpolysiloxane having 33 dimethylsiloxane units in a molecule and terminated at both molecular chain ends each with a siliconbonded chlorine atom in 400 ml of methylene chloride was chilled at 5° C. and ammonia gas was blown into the mixture for 4 hours to effect the reaction keeping the temperature of the reaction mixture not to exceed 20° C. with outer cooling. After the end of the above mentioned reaction time, the reaction mixture was further heated for additional 30 minutes under reflux of the solvent to remove the excess of ammonia dissolved therein followed by cooling and removal of the precipitated ammonium chloride formed as a byproduct in the mixture by filtration to give a solution of a methylsiloxazane polymer of which the main chain structure was composed of the polydimethylsiloxane units (—SiMe$_2$—O—)$_{33}$ and methylsilazane units of the formula MeSi(NH)$_{1.5}$ in a molar ratio of 1:132.

The thus obtained solution was further diluted with methylene chloride to give a solid content of 1% by weight and this diluted solution was applied to a substrate surface as a surface release agent followed by standing for 2 hours at room temperature to find that the substrate surface was coated with a coating film of the cured polysiloxazane compound.

The performance of the thus cured coating film as a surface releasing layer was tested with three kinds of substrate materials in the following manner.

(1) A foamed body of a polyurethane resin was prepared by casting a foamable mixture composed of 20 parts by weight of a polypropyleneglycol triol having an average molecular weight of about 3000, 80 parts by weight of a polypropyleneglycol polyol (Actcoat 52-460, a product by Takeda Yakuhin Kogyo Co.), 10 parts by weight of Freon-11 (a product by Du Pont Co.), 96.5 parts by weight of a polyisocyanate (Millionate MR, a product by Nippon Polyurethane Co.) and 1.0 part by weight of tetramethyl hexadiamine in a metal mold at 50° C. having the surfaces treated with the above described surface release agent to cause in situ foaming followed by curing at room temperature for 1 hour and removing the mold.

(2) A cured epoxy resin body was prepared by casting a uniform epoxy resin mixture of 100 parts by weight of an epoxy resin prepolymer (Epikote 828, a product by Shell Chemical Co.) and 12 parts by weight of triethylene tetramine into an aluminum mold surface-treated with the above prepared surface release agent followed by curing first at room temperature for 2 hours and then at 115° C. for 30 minutes and removing the mold.

(3) A small piece of an Ionomer resin (a product by Du Pont Co.) was melted on the polished surface of a steel plate by heating at 150° C. for 30 minutes followed by cooling to solidify the melt and the releasability of the solidified resin from the steel plate was examined.

The results were that the releasability was excellent in each of the above three tests exhibiting good releasability even after 10 times of repeated casting of the polyurethane resin and the epoxy resin into the metal mold or repeated melting and solidification of the Ionomer resin on the steel plate after a single treatment with the surface release agent.

EXAMPLE 6

Substantially the same synthetic procedure as in the preceding example was undertaken excepting the replacement of the reaction mixture with a solution prepared by dissolving 40 g of a mixture composed of 57.4% by weight of methyl trichlorosilane, 33.0% by weight of dimethyl dichlorosilane and 9.6% by weight of a dimethylpolysiloxane having about 300 dimethylsiloxane units in a molecule and terminated at both molecular chain ends each with a silicon-bonded chlorine atom in 400 ml of methylene chloride to give a clear, colorless solution which was a solution of a methylsiloxazane polymer composed of the dimethylpolysiloxane units of the formula (—SiMe$_2$—O—)$_{300}$, trifunctional methylsilazane units of the formula MeSi(NH)$_{1.5}$ and difunctional dimethylsilazane units of the formula Me$_2$Si(NH) in a molar ratio of 1:910:591.

The thus obtained solution was further diluted with methylene chloride and the performance of the solution as a surface release agent was tested in just the same manner as in the preceding example to give results that the releasability for the foamed polyurethane resin was good for 7 times of repeated casting and sufficient releasability was retained even after 10 times of repeated casting of the epoxy resin in the aluminum mold and 10 times of repeated melting and solidification of the Ionomer resin on the steel plate.

For comparison, a solution of a methylsilazane compound expressed by the unit formula MeSi(NH)$_{1.5}$ was prepared in the same manner as in Example 5 with a solution prepared by dissolving 40 g of methyl trichlorosilane in 400 ml of methylene chloride and the surface-releasing performance of the solution was examined in the same manner as in Example 5 to give results that no releasability at all was exhibited in the tests with the foamable polyurethane resin and the Ionomer resin while the casting of the epoxy resin could be performed three times after a single treatment of the aluminum mold with the solution.

EXAMPLE 7

A reaction mixture composed of 36.9 g of a methyl hydrogenpolysiloxane expressed by the formula

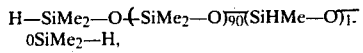
H—SiMe$_2$—O—(SiMe$_2$—O)$_{90}$(SiHMe—O)$_{10}$SiMe$_2$—H, 10.7 g of vinyl trichlorosilane and 30 g of toluene was admixed with 0.04 g of an alcoholic solution of chloroplatinic acid in a concentration of 2% by weight as platinum and the mixture was heated at 80° C. for 5 hours under agitation to give an organopolysiloxane having silicon-bonded chlorine atoms and expressed by the formula

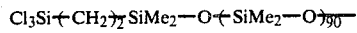
Cl$_3$Si—(CH$_2$)$_2$SiMe$_2$—O—(SiMe$_2$—O)$_{90}$—

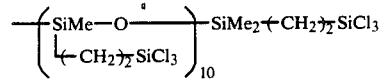

as diluted with toluene.

In the next place, 40 g of a mixture composed of 20.6% by weight of the above obtained product and 79.4% by weight of methyl trichlorosilane and 400 ml of methylene chloride were introduced into a reaction vessel to form a reaction mixture and ammonia gas was brought into contact with the mixture in the vessel chilled at 5° C. continuedly for 4 hours keeping the temperature of the mixture at 20° C. or below. The resultant reaction mixture was a clear solution after filtration to remove the precipitated ammonium chloride. The polymer contained in this solution was identified to be an organosiloxazane polymer composed of 99.75% by moles of the units of the formula MeSi(NH)$_{1.5}$ and 0.25% by moles of the units expressed by the formula

(NH)$_{1.5}$Si—(CH$_2$)$_2$SiMe$_2$—O—(SiMe$_2$—O)$_{90}$—

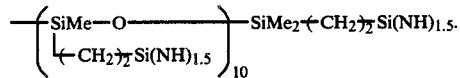

A part of the methylene chloride was evaporated from this solution to such an extent that the solid content of the resultant solution was 20% by weight and the solution was applied to test panels of aluminum, steel and an acrylic resin in a thickness of 10 μm as dried by use of a wire-bar applicator followed by standing in air. The coating film was found to be cured after 60 minutes of standing and the properties of the cured coating film were examined after further standing for 24 hours to complete curing. The results were that no cracks were formed in the film in the mandrel test by bending the coated test panel around a mandrel of 2 mm diameter and no peeling took place in the checkerboard sections in the so-called checkerboard test according to ASTM D 3359 to give an evaluation of 100/100 on each of the coated test panels indicating excellent bendability and adhesion to the substrate surface.

EXAMPLE 8

A reaction mixture was prepared in a reaction vessel by dissolving 40 g of a mixture composed of 78.8% by weight of a dimethylpolysiloxane terminated at both molecular chain ends each with a silicon-bonded chlorine atom and expressed by the formula Cl—SiMe$_2$—O—(SiMe$_2$—O)$_{300}$SiMe$_2$—Cl and 21.2% by weight of methyl trichlorosilane and the reaction of the mixture with ammonia gas was performed in just the same manner as in Example 1 followed by the same treatment of the resultant reaction mixture to give 170 g of a clear, colorless solution. The polymer product contained in this solution was identified to be a methylsiloxazane polymer composed of 80% by moles of the units of the formula Me$_2$SiO and 20% by moles of the units of the formula MeSi(NH)$_{1.5}$.

In the next place, a part of the methylene chloride was evaporated from the above obtained polymer solution to such an extent that the solid content of the resultant solution was 20% by weight and the curability of the product polymer in air and the properties of the cured coating film thereof were tested in just the same manner as in the preceding examples. Curing of the coating film on each of the test panels was complete within 120 minutes to give a rubbery surface film. The checkerboard test undertaken after 24 hours of further standing of the test panels indicated no peeling in the cross-cut sections to be rated in class 5. Further, the coated test panel of aluminum was subjected to the accelerated aging test of the coating film by keeping in a Weather-O-Meter for 1000 hours to indicate absolutely no discoloration and degradation of the coating film thereon.

For comparison, a curable organopolysiloxane composition was prepared by diluting a mixture composed of 85 parts by weight of a dimethylpolysiloxane having an average degree of polymerization of 300 and terminated at both molecular chain ends each with a silanolic hydroxy group, 15 parts by weight of methyl trimethoxysilane and 0.5 part by weight of dibutyltin dilaurate as a curing catalyst with methylene chloride as the diluent. The coating film of the above prepared comparative composition applied to test panels was cured by standing in air for about 8 hours to give a rubbery coating film thereon. After 24 hours of further standing, the cured films on the test panels were rubbed with a finger tip to find that the film was readily peeled off from the substrate surface due to the poor adhesion of the cured film to the substrate surface.

What is claimed is:

1. A method for forming a cured polymeric film on the surface of a substrate which comprises: coating the substrate surface with an organosiloxazane polymer comprising room temperature-curable organosilicon polymer comprising (a) at least one organosiloxane unit represented by the unit formula $R^1_a SiO_{(4-a)/2}$, 

and (b) at least one organosilazane unit represented by the unit formula $R^2Si(NR^3)_{3/2}$.

in which $R^1$, $R^2$ and $R^3$ are each a hydrogen atom or a substituted or unsubstituted monovalent hydrocarbon group, not all of them being simultaneously hydrogen atoms, and the subscript a is a positive integer of 1, 2 or 3; and subjecting the coating film to exposure to an atmosphere containing moisture.

2. The method as claimed in claim 1 wherein the organosiloxazane polymer comprises at least one diorganopolysiloxane moiety represented by the general formula $$-(-SiR^1{}_2-O-)_m-,$$

in which $R^1$ has the meaning as defined above and m is a positive integer of at least 8, in the molecule.

3. The method as claimed in claim 2 wherein the group denoted by $R^1$ is a methyl group.

* * * * *